United States Patent [19]
Aitken et al.
[11] Patent Number: 4,726,275
[45] Date of Patent: Feb. 23, 1988

[54] ELECTRONIC MUSICAL INSTRUMENT

[75] Inventors: William A. Aitken, Oxfordshire; Anthony J. Sedivy; Michael S. Dixon, both of London, all of England

[73] Assignee: Synthaxe Limited, London, England

[21] Appl. No.: 31,400

[22] Filed: Mar. 27, 1987

Related U.S. Application Data

[63] Continuation-in-part of Ser. No. 691,486, Jan. 8, 1985, Pat. No. 4,658,690.

[30] Foreign Application Priority Data

Jul. 30, 1985 [GB] United Kingdom ................. 8519204
Jul. 29, 1986 [WO] PCT Int'l Appl. ... PCT/GB86/00448

[51] Int. Cl.[4] ................................................ G01H 1/02
[52] U.S. Cl. ........................................ 84/1.15; 84/1.16
[58] Field of Search ...................... 84/1.14, 1.15, 1.16, 84/1.24, 1.25, 1.27

[56] References Cited

U.S. PATENT DOCUMENTS

| | | | |
|---|---|---|---|
| 4,068,552 | 1/1978 | Allen | 84/1.16 X |
| 4,099,438 | 7/1978 | Hiyoshi et al. | 84/1.25 |
| 4,306,480 | 12/1981 | Eventoff | 84/1.25 |
| 4,348,390 | 9/1982 | Chobanian et al. | 84/1.15 |
| 4,372,187 | 2/1983 | Berg | 84/1.16 |
| 4,630,520 | 12/1986 | Bonanno | 84/1.16 |
| 4,653,376 | 3/1987 | Allured et al. | 84/1.16 |
| 4,665,788 | 5/1987 | Tripp et al. | 84/1.27 X |
| 4,676,134 | 6/1987 | Newell | 84/1.16 |

*Primary Examiner*—W. B. Perkey
*Attorney, Agent, or Firm*—Majestic, Gallagher, Parsons & Siebert

[57] ABSTRACT

A guitar-like electronic musical instrument for use with a synthesizer has six pitch strings on the neck which the player depresses onto conductive frets to determine the selected semitone. A transducer senses if the player forces the string laterally on the fret and if the string is so laterally forced (bent) beyond a threshold, further pitch detection is inhibited. The fret construction can be much simplified and there is no danger of spurious notes being caused by contact with adjacent strings.

4 Claims, 2 Drawing Figures

ELECTRONIC MUSICAL INSTRUMENT

This is a continuation-in-part of U.S. application Ser. No. 691,486 filed Jan. 8, 1985, now U.S. Pat. No. 4,658,690.

BACKGROUND OF THE INVENTION

This invention relates to electronic musical instruments, and in particular is concerned with improvements in the guitar-like instrument the subject of our International patent application No. PCT/GB84/00158 published under the publication No. WO 84/04619, (U.S. patent application Ser. No. 691,486) the disclosure of which is hereby incorporated by reference.

Our earlier application describes a guitar-like musical instrument for use with a synthesizer. The instrument has a body and a neck, and the neck carries six pitch strings, which the player depresses onto conductive frets to determine the selected semitone. The body carries six trigger strings, which can be plucked or strummed to initiate or trigger the desired notes. Alternatively, the notes can be triggered by six trigger keys. Means are provided for detecting the point at which the pitch strings are depressed, but problems can arise when the player bends the string sideways to achieve special effects. In that case it will be possible for the pitch sensing circuitry to produce a spurious output. Embedded in the finger board are a number of string bend detection coils which sense the sideways bending of the strings and provide a control signal for producing special effects in response thereto.

SUMMARY OF THE INVENTION

In accordance with this invention, we propose an arrangement by which spurious pitch signals which can arise when string bending takes place are avoided.

We have appreciated that when a player decides to bend the string, he must first make proper contact with the string on the fingerboard, and thus a proper measure of pitch to the nearest whole semitone is obtained. Problems arise after that instant when the player tries to move the string sideways, to a point where it might make contact with an adjacent string.

Accordingly, we propose that when the string bend detection system senses that bending is being commenced, that is to say that a predetermined amount of bending has been achieved, the value of the pitch to the nearest whole semitone sensed at that time is held and no new semitone determination is made until the string bend has ceased. During string bend the player can not change frets, so that the semitone determination remains valid.

Consequently the current fret code can be firmly established at a very early stage of the string bend action, and during the time that the string is being significantly bent there is no need to keep scanning in order to detect the fret on which the string is stopped.

The improvement thus obtained can be used to save processing time. If a string is being bent or deflected then there is no need to keep scanning to update the fret codes on that string, as the string will stay on that fret at least until the bent string is returned to or near to the undeflected position. Therefore, the fret code can simply be frozen when the string bend deflection value for a string exceeds a certain threshold.

This is in addition to the advantage obtained in that during the period of string bending while the fret code is frozen, it does not matter if there is inadvertent shorting to another string or fret as this spurious data will not be collected.

The circuit structure required to implement this invention can be essentially the same as in our earlier application. If the string bend value is above the threshold then step 1 in FIG. 44 of our earlier application is gated out.

BRIEF DESCRIPTION OF THE DRAWINGS

The invention will be described in more detail, by way of example, with reference to the drawings, in which.

DETAILED DESCRIPTION OF THE PREFERRED EMBODIMENT

The present invention is a modification of and will be described in the context of the SYNTHAXE (trade mark) electrical musical instrument the subject of our earlier application. Reference is made to that application to avoid the need for repetition of the voluminous description of the instrument therein contained.

The instrument is generally configured with the shape of a guitar and has six strings which run side-by-side the length of a neck of the instrument which is attached to a body. The strings can be pressed by the player onto a fingerboard which is provided with transverse frets which define the positions appropriate to different semitones to be played. In the SYNTHAXE instrument the strings do not vibrate to produce notes, all they do is to provide a way by which a player can define the notes in a manner with which he is already familiar from normal guitar-playing.

Figure 1:
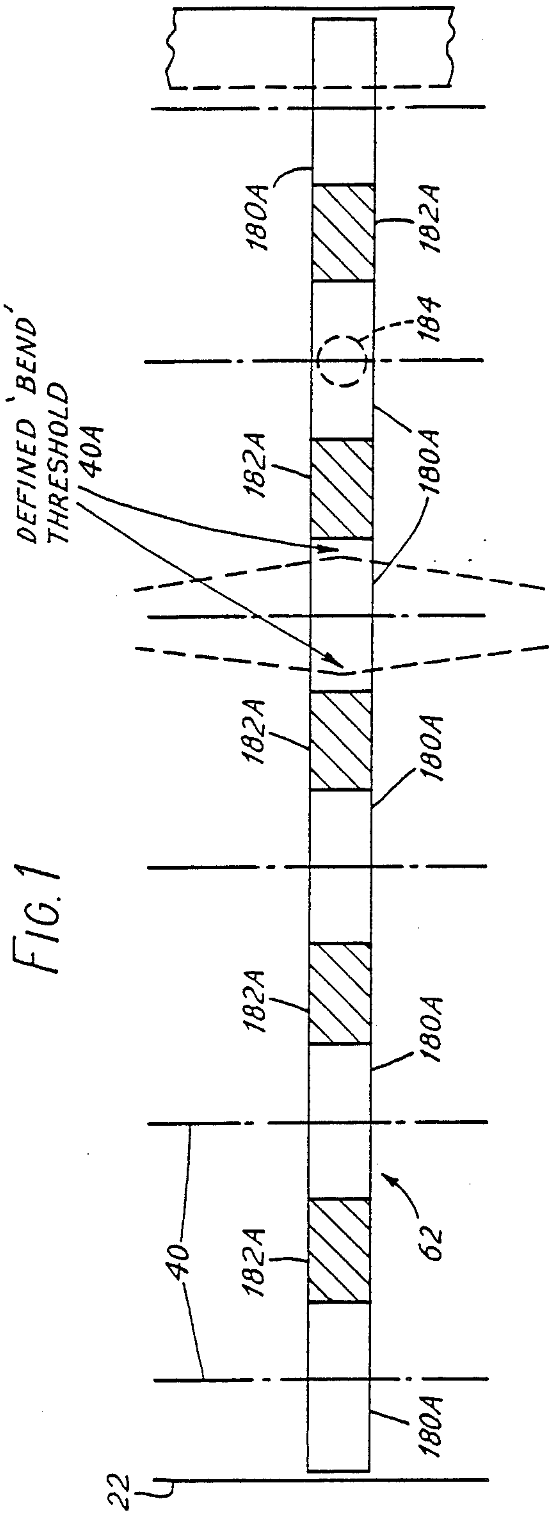
FIG. 1 is a schematic plan view of part of a fingerboard of an electrical musical instrument embodying the invention showing one fret position.

FIG. 1 shows one fret 62 on the fingerboard of the neck 22 of the instrument in a view similar to that of FIG. 16 of our earlier application. The six guitar strings 40 pass over the fret 62.

As shown the fret 62 is made in discontinuous form with six conductive sections 180A one under each string alternating with insulative sections 182A between the conductive sections. The conductive sections 180A are formed by T-shaped pins the stems 184 of which pass through the fingerboard for electrical connection to their lower ends. The conductive sections 180A are of simpler oblong shape to those of FIG. 16 of our earlier application and can be made to less stringent tolerances as they do not now have to mate closely together to each other. The insulative sections 182A can be formed by bonding or moulding to give the same cross-sectional shape to that of the pins 180A, and the fret as a whole is polished off to provide a smooth feel to the player.

In other respects the construction of the instrument is as in our earlier application and reference is made in particular to the following figures thereof, namely:

FIG. 5 which shows the overall physical construction of the instrument;

FIG. 24 which is a schematic block diagram of the instrument electronics;

FIG. 32 which shows how string bend coils are physically placed in relation to the neck strings and bridge;

FIGS. 33 and 34 which show the construction of the string bend transducer coils; and FIG. 35 which is a graphical representation of the response of the output of the string bend transducer as a string is moved laterally across it.

Experienced guitar players make considerable use of "string bending" to achieve interesting musical effects. What they do is to depress the guitar string onto the fret, and then to displace it across the fret to slightly change the string tension and produce slight variation in the note sounded.

When using the SYNTHAXE electronic instrument this variation is detected by the string bend detection coils and this note variation can therefore be simulated purely electronically.

However, occasions can arise where it gives rise to difficulty. The string/fret contact is essential to enable the pitch of the required note to be detected by the system electronics. Thus the fret pins in our earlier application have to be manufactured with great precision so that when they are fitted together the gaps between the pins are close enough to ensure that when a string is pulled laterally across the gap it maintains proper contact with the pins during the transition, and it does not snag in the gap. However, the gaps must not be so close that a short circuit is caused between the pins. Manufacture to such tight tolerances is difficult and expensive.

In addition it is sometimes possible to generate spurious fret codes, indicating spurious notes, when bending a string excessively. This is due to the fact that a string bent to excess may contact another string which is fretted on another fret. A short circuit to a spurious fret may result.

We have appreciated that a guitar player does not change frets during the lateral deflection or bending of a string. Thus we have appreciated that when the deflection exceeds a certain amount, the string can be assumed still to be in contact with the same fret as was detected during the last scan before the string bend value exceeded the threshold. Consequently, once the string bend detection system determines that string bending is taking place beyond a defined threshold, the pitch detection operation can be suspended until the string bending returns to below the threshold.

The manner in which this is achieved will now be described with reference to the drawings. FIG. 1 shows at 40A in dashed lines the maximum deflection one of the strings can undergo before the string bend detection system (described in our earlier application) produces a signal exceeding the threshold. Lateral deflection outside this range will inhibit pitch detection.

Figure 2:
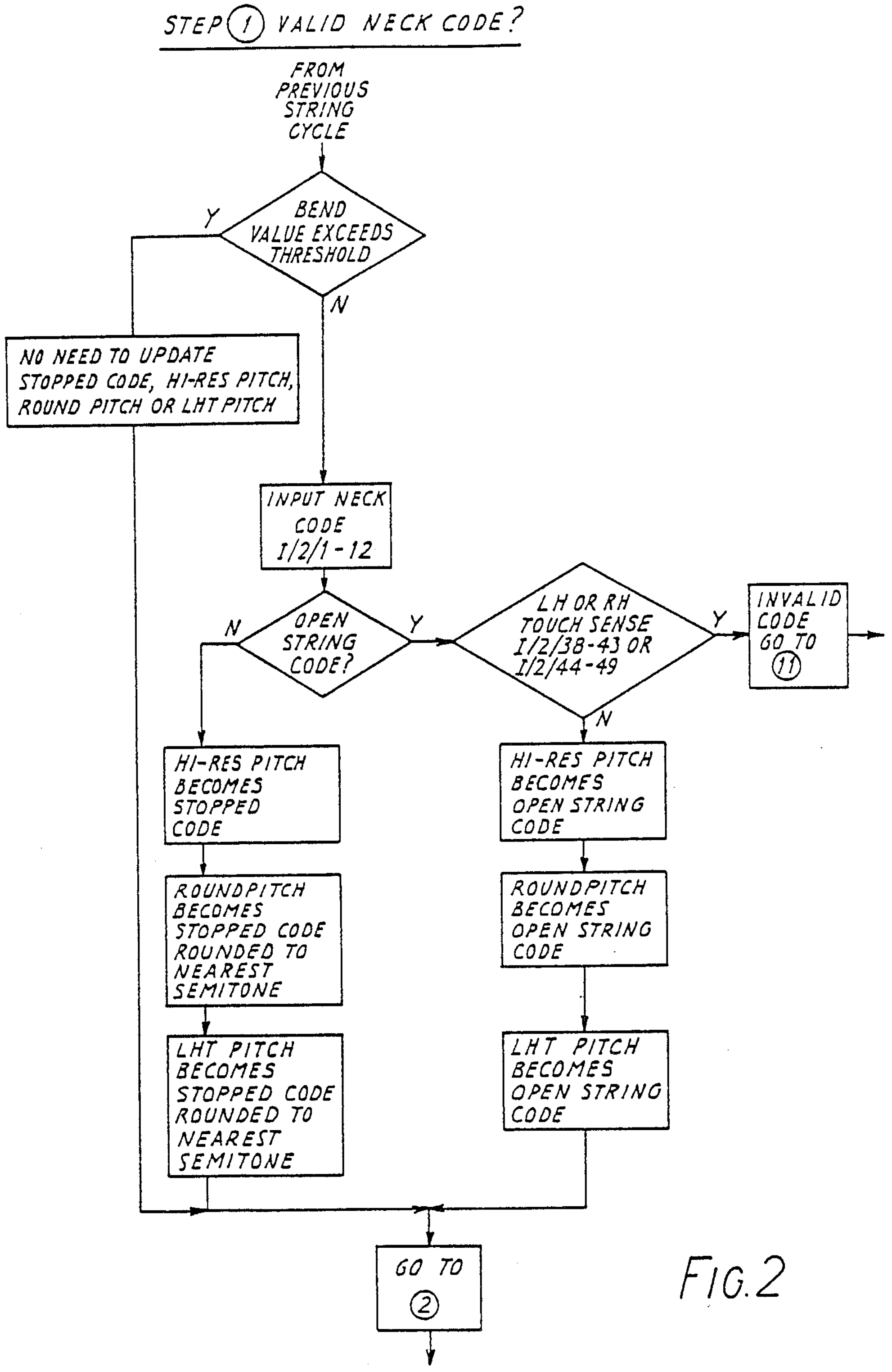
FIG. 2 is a flowchart illustrating the modification to the software described in detail in our earlier application which is required to implement the present invention.

In our earlier application FIGS. 43 to 58 are flow charts illustrating the operations carried out in the processors contained in the instrument. A simple modification is required to logic step 1 of the operations illustrated on FIG. 44. This modification is shown on FIG. 2 of the accompanying drawings and comprises the addition of a further test "BEND VALUE EXCEEDS THRESHOLD?" If the answer is YES, the remaining functions of logic step 1 are by-passed and the operation passes to logic step 2. Thus the values previously determined for the pitch variables are maintained.

The bend threshold falls within the limits defined by the conductive pins 180A in FIG. 1. Once this limit is exceeded, it does not matter if the string is bent further into the insulating material and the contact with the fret pin is lost, because the fret code is now frozen.

The pins can thus be of much simpler construction, and the dangers associated with spurious contact with adjacent strings avoided.

We claim:

1. An electronic musical instrument configured to represent a guitar-like instrument and comprising a neck and a body, in which the neck carries a plurality of pitch strings overlying a plurality of transverse frets, and including pitch sensing means for electrically sensing the location of depression of the strings onto the frets by a player, and deflection sensing means for sensing forced lateral deflection of the strings from their undeflected positions and producing an output in response thereto, characterised by threshold responsive means responsive to the output of the deflection sensing means exceeding a predetermined threshold to hold the output of the pitch sensing means until the said output returns below the said threshold.

2. An instrument according to claim 1, in which the threshold-responsive means inhibits operation of the pitch sensing means while the threshold is exceeded.

3. An instrument according to claim 1, in which the frets are formed of alternating conductive and insulative portions having a common profile.

4. An instrument according to claim 1, in which the deflection sensing means comprises coils in the neck of the instrument.

* * * * *